United States Patent [19]

Tankel

[11] 4,104,895
[45] Aug. 8, 1978

[54] VEHICLE STEERING COLUMN IGNITION LOCK PROTECTIVE DEVICE

[75] Inventor: Lawrence Tankel, West Roxbury, Mass.

[73] Assignee: Car Cuf Industries, Inc., Brookline, Mass.

[21] Appl. No.: 786,071

[22] Filed: Apr. 11, 1977

[51] Int. Cl.² .............................................. E05B 17/14
[52] U.S. Cl. ....................................... 70/237; 70/424; 70/428
[58] Field of Search ...................... 70/18, 43, 211, 237, 70/252, 424, 428, 455, 370, DIG. 20; 180/114; D8/333

[56] References Cited

U.S. PATENT DOCUMENTS

| D. 227,547 | 7/1973 | Bodan | D8/333 |
|---|---|---|---|
| 2,050,696 | 8/1936 | Schoorel | 70/DIG. 20 |
| 3,636,742 | 1/1972 | Raney | 70/424 |
| 3,665,738 | 5/1972 | Pescuma et al. | 70/211 |
| 3,805,564 | 4/1974 | Velardo | 70/18 |
| 3,811,303 | 5/1974 | Robertson | 70/237 |
| 3,948,069 | 4/1976 | Imbriano | 70/428 |
| 4,008,589 | 2/1977 | Harrell | 70/424 |
| 4,020,662 | 5/1977 | Fowler | 70/237 |

FOREIGN PATENT DOCUMENTS 335,862  4/1921  Fed. Rep. of Germany .............. 70/18

*Primary Examiner*—Rodney H. Bonck
*Attorney, Agent, or Firm*—William Nitkin

[57] ABSTRACT

An improved steering column ignition lock protective device having a casing with a shackle pivotally attached at a first end of the casing with a bolt lock positioned at a second end of the casing adapted to engage through an aperture in the shackle when the device is positioned around a steering column.

2 Claims, 5 Drawing Figures

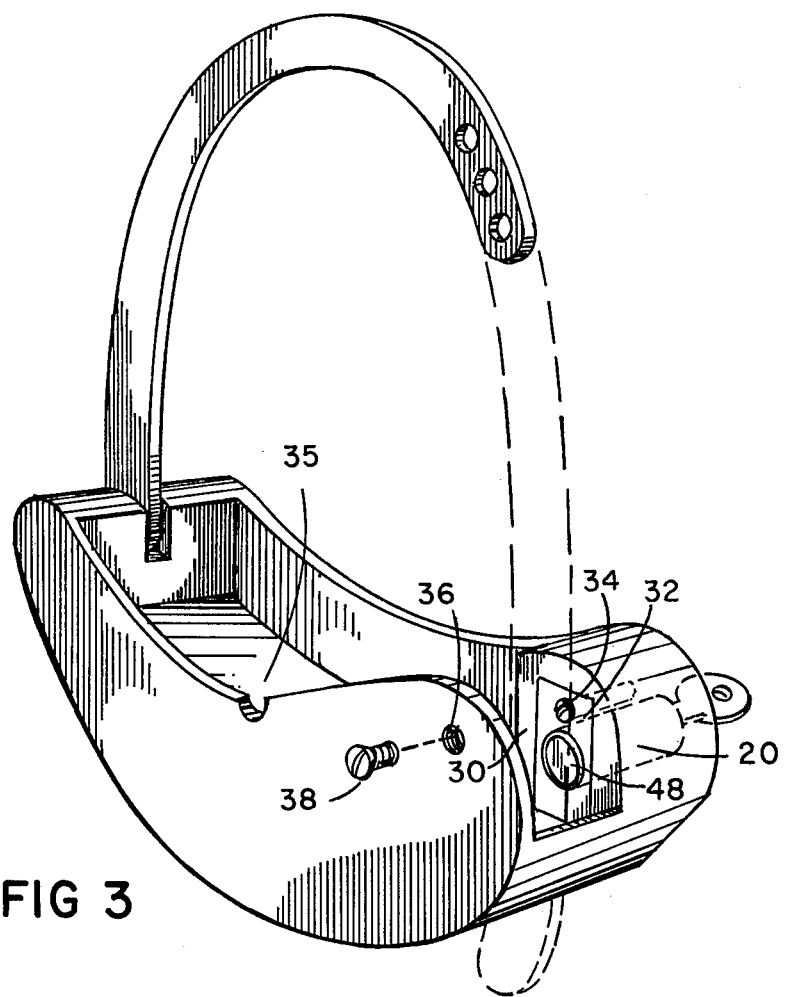
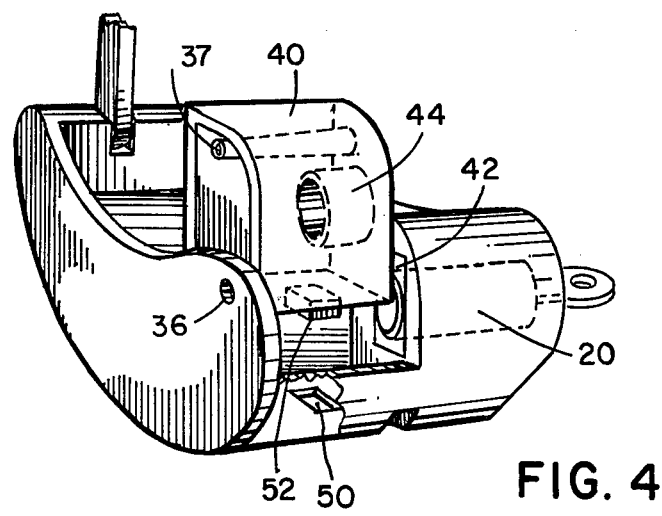

VEHICLE STEERING COLUMN IGNITION LOCK PROTECTIVE DEVICE

BACKGROUND OF THE INVENTION

The device of this invention relates to theft prevention of motor vehicles and more particularly relates to a protective device positioned over a steering column ignition lock for the prevention of tampering therewith.

At present there are several devices now utilized for the protection of a vehicle's steering column ignition lock. These devices commonly have members which encircle the steering column as it is well-known that many car thieves utilize dent removers to remove the lock assembly by inserting them into the ingnition locks of vehicles and are thereby able to start the cars. It has been found that devices that encircle the steering column and cover the ignition lock prevent the insertion of such dent removing devices, keys, or other devices used by car thieves. Examples of such car theft prevention devices which are patented are numerous and include U.S. Pat. No. Des.227,547 to Bodan. More extensive and complex devices in this area are disclosed in U.S. Pat. Nos. 3,665,738 to Pescuma et al; 3,811,303 to Robertson; 3,948,069 to Imbriano; and 3,916,658 to Barry. All of these patents disclose devices with means for covering all or portions of the ignition key lock assembly and include locking means for for the devices to be held upon the steering column. Some of the aforementioned patented devices have relatively complex structures which can be costly to produce. The Pescuma patent and the Robertson patent rely on padlocks which have certain disadvantages in that they are accessible for a thief to attempt picking or cutting through the hasp. The Imbriano device discloses an internal key lock mechanism within the device itself with the key hole facing the dashboard. This feature has the advantage in that it is difficult for a thief to pick a lock that is facing away from him and, with limited space in which to operate, it would be difficult for a thief to use a dent puller as such devices require room in which to be manipulated.

SUMMARY

It is an object of this invention to disclose an improved vehicle steering column ignition lock protective device of simple and economic construction able to be utilized on a variety of different motor vehicles without modification.

The device of this invention consists of a casing having a first and second end with a key receptacle area and a shackle having a first and second end, the first end of the shackle pivotally affixed to the first end of the casing, which extends when closed around the steering column of the vehicle. The shackle is affixed to the casing by a tapered shackle pin which is irremovably inserted into the body of the casing and through an aperture at the first end of the shackle. The shackle has defined within it at least one shackle aperture at its second end through which a bolt of a lock is inserted once the shackle is closed and engaged in the opposite portion of the casing. A casing insert member is utilized during construction to facilitate the insertion of a lock member within a lock receipt aperture defined within the casing. The lock member has a lock flange and is inserted when the casing insert is not positioned in the casing. The key portion of the lock is acccessible from the outside of the casing through the lock receipt aperture. The flange of the lock is engaged with portions of the casing, and at least one screw is inserted to hold it in place. A screw aperture defined in the casing can be utilized for insertion of a screwdriver to tighten the screw as it is in a difficult area to otherwise reach. At the base of the casing insert aperture is a female receptacle slot which engages a male extension portion of the casing insert. The casing insert has within it a bolt receiving aperture for receipt of the lock bolt after it has passed through one of the shackle apertures. The casing insert also has a casing screw receipt aperture defined within it for receipt of a screw through the screw aperture in the casing which holds the casing insert in place. Once the lock is inserted within the lock receipt aperture in the casing, one may depress the lock to engage the bolt through the shackle when closed. When unlocked, the bolt of the lock snaps forward out of the shackle aperture allowing the device to be opened. In construction the casing insert can be held within the unit by a casing screw.

It should be noted that when the casing is in place on the steering column, the key member faces in the direction of the dashboard of the vehicle so that it would be difficult for a car thief to pick or attempt to open it with a dent removing device. It should further be noted that the mere removal of the casing screw in an attempt to remove the casing insert will have no effect because the lock bolt extends into the casing insert holding it in place when the device is locked so that it cannot be removed. The shackle pin used to hold the shackle in the opposite end of the casing, being tapered and not extending all the way through the casing, prevents the pin's removal.

BRIEF DESCRIPTION OF THE DRAWINGS

FIG. 3 is a perspective view of the device of this invention.

FIG. 4 is a partial view of the device illustrating casing insert positioned above the casing insert area.

DESCRIPTION OF THE PREFERRED EMBODIMENT

Figure 1:
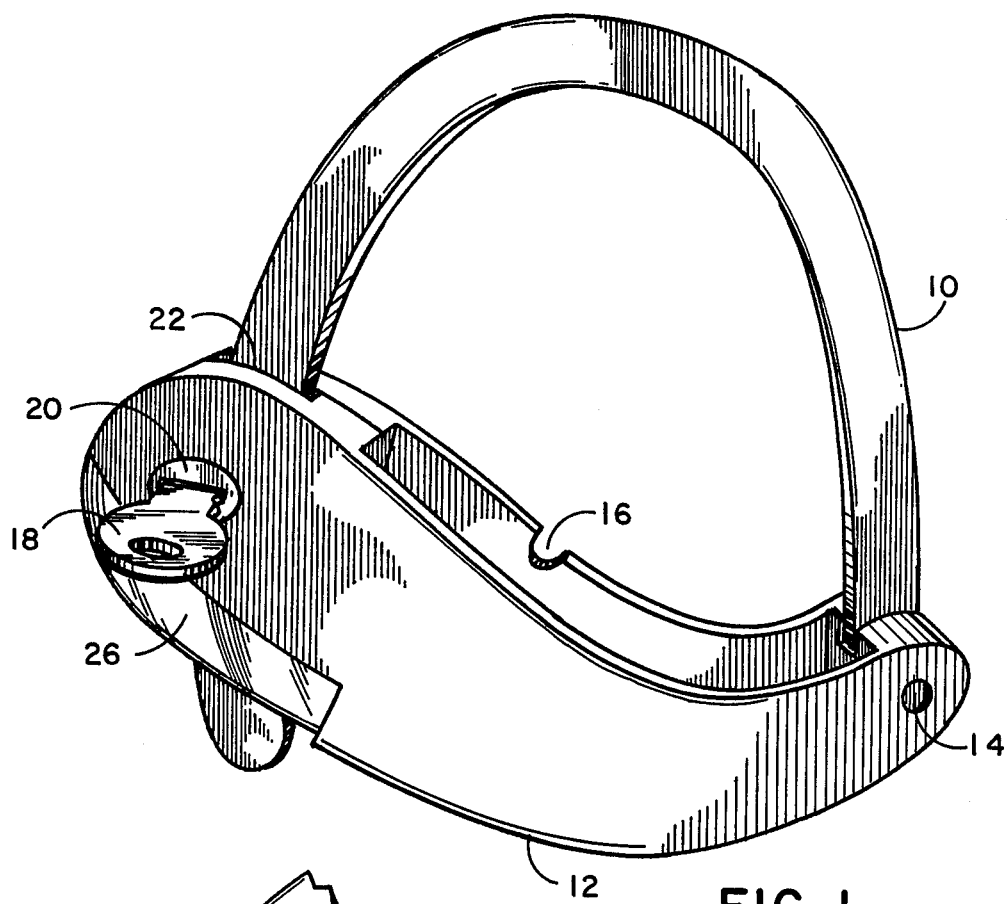
FIG. 1 is a side view of the device of this invention.

FIG. 1 illustrates a side view of the device of this invention. Seen is U-shaped shackle 10 and casing 12. Shackle 10 is pivotally affixed within the first end of casing 12 by shackle pin 14. Further seen in casing 12 is indicator receptacle slot 16 to allow room for any signal indicator switch that may extend out of the steering column. Key member 18 is seen inserted into lock 20 and shackle 10 is inserted into shackle insertion slot 22 which can extend through the body of casing 12 so that the shackle can extend therethrough to different lengths to accommodate a variety of steering column diameters. Also illustrated is gear shift receptacle slot 26 which is an angular indentation along one side of the casing to allow room for the gear shift lever of the vehicle when the shackle is in place on the steering column.

Figure 2:
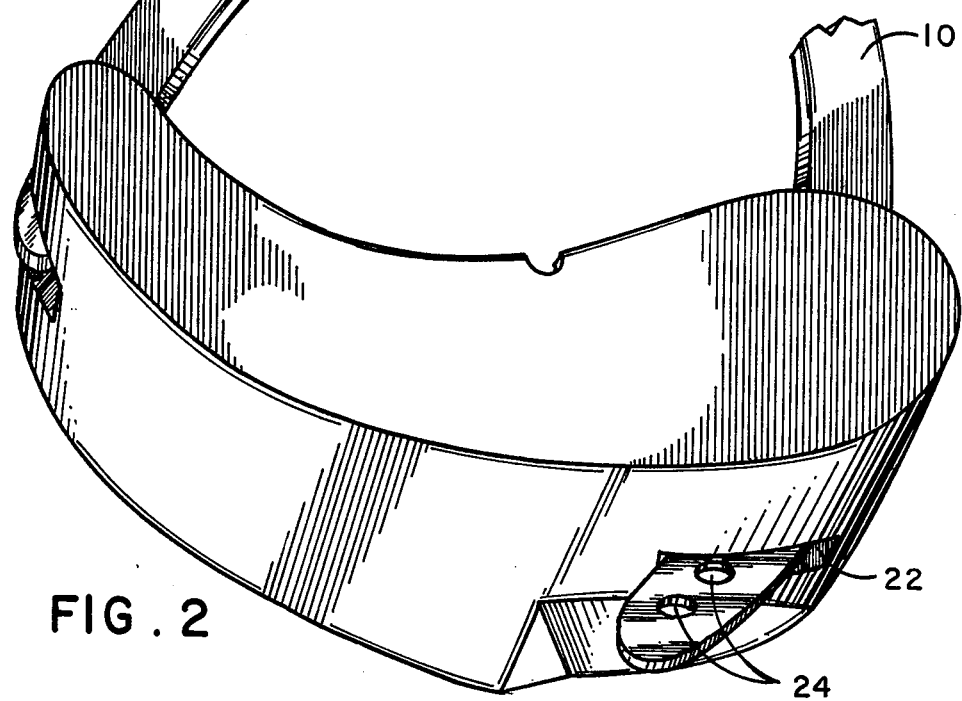
FIG. 2 is a bottom perspective partial view of the device of this invention.

In FIG. 2 the shackle is seen extending through shackle insertion slot 22 so that two of the shackle apertures 24 are visible. It has been found that a series of apertures on the shackle are desirable in order to make a universal mount to fit a large variety of vehicles in use today. Shackle 10 may also have a variety of shapes so as to further accommodate vehicles with different steering column configurations.

FIG. 3 illustrates the device of this invention with the shackle in an open position, the closed position being in outline form, and the casing insert removed from the casing insert area 30. Seen is lock member 20 in outline form and lock flange 32 which is held in place by screw 34. This screw can be tightened by inserting a screwdriver through casing screw insertion aperture 36 located in the casing. Casing screw 38 is illustrated apart from the casing and inserted into casing screw insertion aperture 36 after casing insert 40, seen in FIG. 4, is positioned to hold it in place. Shown in cutaway view is female receptacle slot 50 which receives the male extension portion 52 of the casing insert when the casing insert is positioned in the casing insert area 30. It is noted that the area between the body of the casing and the casing insert 40 forms shackle insertion slot 22. Further seen in this view is bolt receiving aperture 44 within the casing insert 40 into which bolt 48 engages when lock member 20 is depressed inward. To disengage the lock, one inserts and turns a key, and the bolt member disengages. Also seen in FIG. 4 is casing insert 40 shown lifted above its inplace position in the casing. When it is located in place, casing screw 38 is inserted through casing screw insertion aperture 36 and into casing screw receipt aperture which has threads therein in complementary relation to the threads on the casing screw for engagement thereof to hold casing insert 40 in position.

Figure 5:
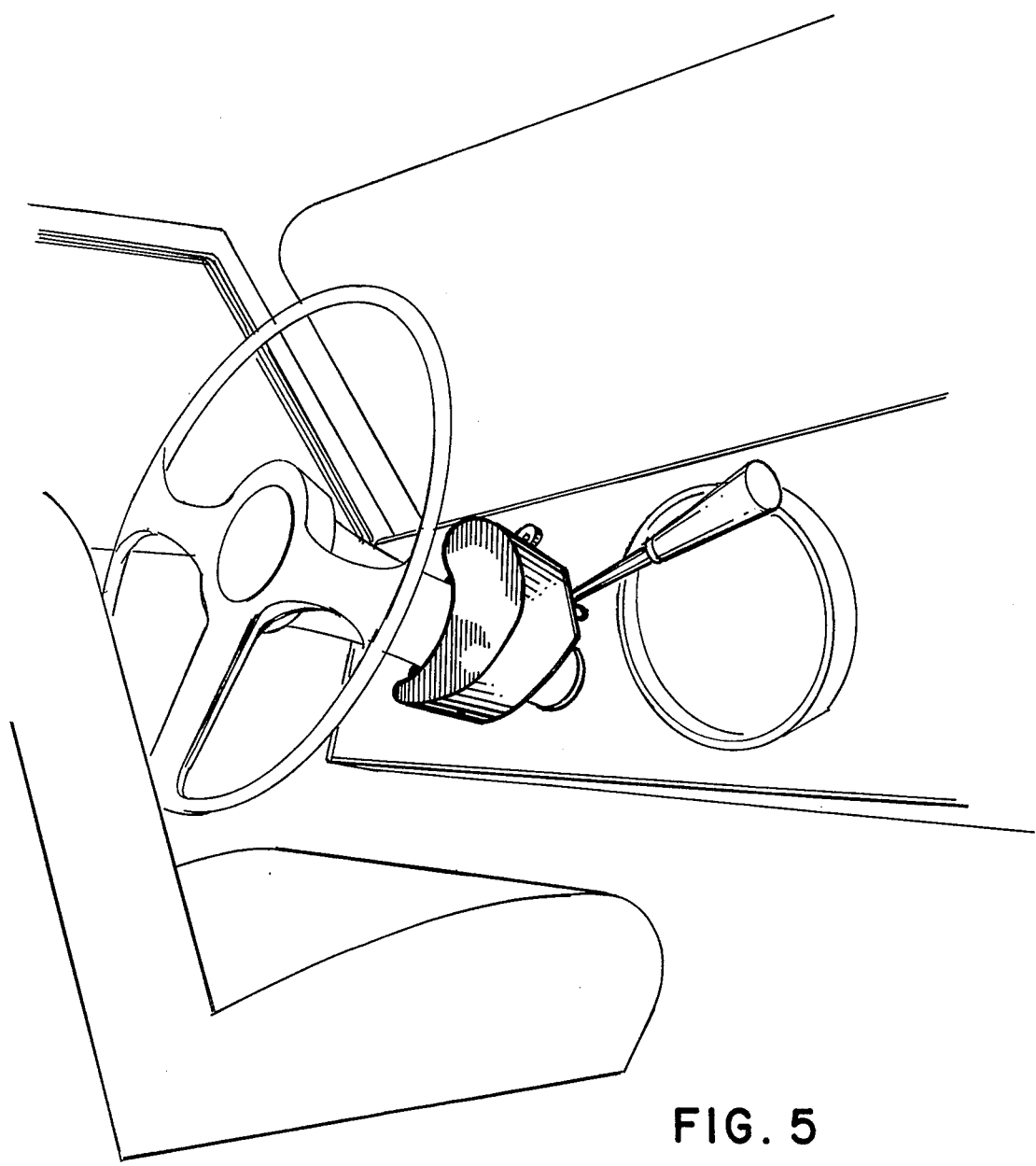
FIG. 5 is a view of the device of this invention in place on a vehicle's steering column.

FIG. 5 illustrates the device of this invention in use and installed on the steering column of an automobile covering the ignition lock thereof. The ignition key assembly on the steering column fits within the key receptacle area 35 as seen in FIG. 1 which is the hollowed out area within casing 12. In use an individual places the device of this invention around the steering column, closes the shackle into the shackle receptacle slot, and when it is snug against the steering column, depresses the lock thereby engaging the bolt through the shackle aperture most appropriate for the particular steering column size. This will prevent anyone from tampering with the ignition key assembly of the motor vehicle. When not in use, the device can be unlocked and can be stored within the vehicle.

The device of this invention can be constructed of case-hardened steel or equivalent material and can be covered with a plastic coating for a smooth, cushioned surface.

Although the present invention has been described with reference to particular embodiments, it will be apparent to those skilled in the art that variations and modifications can be substituted therefor without departing from the principles and spirit of the invention.

I claim:

1. A vehicle steering column lock protective device comprising:
   a casing having a base, first and second parallel sidewalls affixed to said base, and first and second ends affixed to said base and said sidewalls;
   a u-shaped shackle having a first and second end, the first end of said shackle pivotally mounted at the first end of said casing, and at least one shackle aperture defined within said shackle in proximity to said shackle's second end;
   said casing having defined therein an ignition key lock receptacle area in a central portion thereof between said sidewalls, a shackle insertion slot centrally located in the base of said casing proximal to said casing's second end, a casing insert aperture proximal to said casing's second end and adjacent to said second sidewall, a lock receipt aperture in said first sidewall proximal to said casing's second end, a female receptacle slot in said base at the bottom of said casing insert aperture, a screw aperture in said second sidewall adjacent to said casing insert aperture, and a gearshift receptacle slot formed by an angular indentation in said casing and first sidewall proximal to said casing's second end below said lock receipt aperture and to the side of said shackle insertion slot;
   a casing insert adapted for insertion into said casing insert aperture;
   a lock member of the push-to-lock, key release type having a lock bolt and lock flange member, said lock member adapted to be inserted within said lock receipt aperture from the direction of said casing insert aperture when said casing insert is not inserted therein, said lock bolt and lock flange facing said casing insert aperture, said lock flange adapted to be affixed to a portion of said first sidewall adjacent said casing insert aperture;
   lock flange means for affixation of said lock flange to said casing, the mechanical fastening of said lock flange means for affixation effected through said screw aperture; and
   said casing insert further having a male extension portion at its base adapted to mate with said female receptacle slot at the bottom of said casing insert aperture, said casing insert further having defined therein a bolt receiving aperture and a screw receipt aperture, said casing insert being adapted for insertion into said casing insert aperture so as to be spaced apart from said lock flange a distance sufficient to allow said shackle to pass there between with said bolt receiving aperture opposite said lock bolt; and after said insertion, said casing insert to be affixable in position by casing insert means of affixation inserted through said screw aperture in said second sidewall engaging into said casing insert's screw receipt aperture so that when said shackle is in a closed position and said push-to-lock, key release lock is depressed, said lock bolt passes through said shackle aperture and into said bolt receiving aperture of said casing insert thereby retaining said casing insert in said casing insert aperture when locked even if said casing insert means of affixation inserted through said casing screw aperture engaging said casing insert should otherwise be removed.

2. The device of claim 1 wherein said shackle is planar, being sufficiently thin so as to avoid contact with protrusions on said steering column.

* * * * *